United States Patent [19]

Oka

[11] 4,378,705

[45] Apr. 5, 1983

[54] RECIPROCATING DEVICE

[75] Inventor: Kenji Oka, Ebina, Japan

[73] Assignee: Tokico, Ltd., Kawasaki, Japan

[21] Appl. No.: 179,530

[22] Filed: Aug. 19, 1980

[30] Foreign Application Priority Data

Aug. 20, 1979 [JP] Japan ................................ 54-105639

[51] Int. Cl.³ ................................................ F16H 19/06

[52] U.S. Cl. ........................................................ 74/37

[58] Field of Search ........................ 74/37, 89.2, 89.21, 74/89.22

[56] References Cited

U.S. PATENT DOCUMENTS

| | | | |
|---|---|---|---|
| 524,607 | 8/1894 | Pagett | 74/37 |
| 1,611,790 | 12/1926 | Starr | 74/37 |
| 4,118,993 | 10/1978 | Miyoshi et al. | 74/37 |
| 4,281,556 | 8/1981 | Weishew | 74/37 |

FOREIGN PATENT DOCUMENTS

| | | | |
|---|---|---|---|
| 249287 | 7/1926 | Italy | 74/37 |
| 45-15772 | 2/1970 | Japan | 74/37 |
| 617130 | 2/1949 | United Kingdom | 74/37 |

*Primary Examiner*—Lawrence J. Staab

*Attorney, Agent, or Firm*—Michael N. Meller; Anthony H. Handal

[57] ABSTRACT

A reciprocating device comprises an endless member such as a chain or a belt having a forward and a backward side spans and driven to circulate in one direction, a reciprocating member guided substantially parallel to both the forward and backward side spans of the endless member, engaging mechanism provided on the reciprocating member which selectively engages with the forward or the backward side span of the endless member, and a changeover mechanism for switching the engaging mechanism from either one of the forward or backward side span of the endless chain to the other at the preselected limit position of the reciprocation movement range of the reciprocating member. The reciprocating member moves according to the movements of the forward side span of the endless chain upon engagement of the engaging mechanism to the forward side span of the endless chain, and moves respectively when engaged with the backward side span of the endless chain. The reciprocating movement range of the reciprocating member is determined by the changeover timing of the changeover mechanism.

2 Claims, 8 Drawing Figures

RECIPROCATING DEVICE

BACKGROUND OF THE INVENTION

This invention relates generally to reciprocating devices, and more particularly to a reciprocating device in which a reciprocating member alternately and selectively engages with either the forward (going up) side or the backward (going down) side of an endless member such as an endless chain or belt which is running in one direction, thereby being reciprocated.

Conventionally, in an automatic spray-coating painting apparatus used in a factory assembly line, for example, the spray-coating device is attached to a reciprocating device. A typical example of this is one in which two opposing sprocket wheels are joined by an endless chain, and the reciprocation of the reciprocating member is achieved by the movements of the chain.

This known reciprocating device has a disadvantage in which the reciprocating member reciprocates over the full distance between the two sprocket wheels, regardless of the size of the object to be painted. Accordingly, the reciprocating member can not reciprocate in only the desired range required for the painting process. Since the reciprocating range of the reciprocating member cannot be adjusted, and the reciprocating member undergoes unnecessary movements, it resulted in the degradation of the operation efficiency of the process.

An alternative method of providing reciprocation of the spray-coating device according to the size of the object to be painted, is to enable the chain to be driven in both directions.

However, this requires a bi-rotational motor, resulting in high cost and complication of the device construction, in addition, device of this type incorporates a plurality of guide posts to guide the reciprocating member.

Consequently, it has a disadvantage in that the guide posts have to be set up parallel to each other, which is difficult to achieve.

SUMMARY OF THE INVENTION

Accordingly, it is a general object of the present invention to provide a novel and useful reciprocating device in which the above described disadvantages have been removed.

More specifically, an object of the present invention is to provide a reciprocating device in which the reciprocating member undergoes reciprocation by alternately and selectively engaging with either the forward (going up) side or the backward (going down) side of an endless member such as an endless chain or belt. The endless member is driven to circulate in one direction. The forward side and the backward side of the endless member are positioned substantially parallel to each other. By the provision of this feature of the invention, it is possible to select the reciprocating range of the reciprocating member, by selecting the timing for the alternate engaging of the reciprocating member with either the forward or the backward side of the endless member. Accordingly, since the reciprocating member only reciprocates within the required range, the reciprocating member does not undergo unnecessary movements, and thus when applied to a spray-coating painting apparatus, for example, the reciprocation distance of the spray-coating nozzle can be selected and adjusted according to the size of the object to be painted.

Another object of the present invention is to provide a reciprocating device in which the reciprocating member is guided by simple guide means.

Other objects and further features of the present invention will be apparent from the following detailed description with respect to referred embodiments of the invention when read in conjunction with the accompanying drawings.

DETAILED DESCRIPTION

Figure 1:
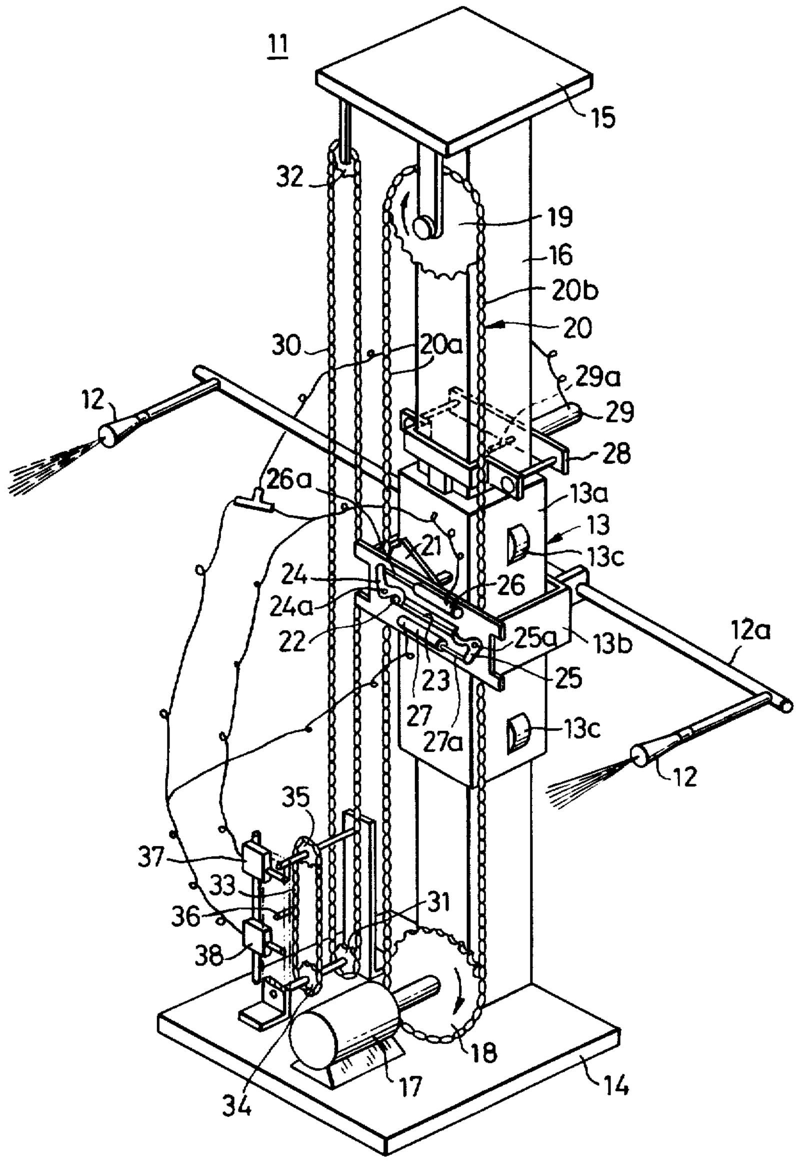
FIG. 1 is a perspective view showing a first embodiment of the reciprocating device according to the present invention.
Figure 2:
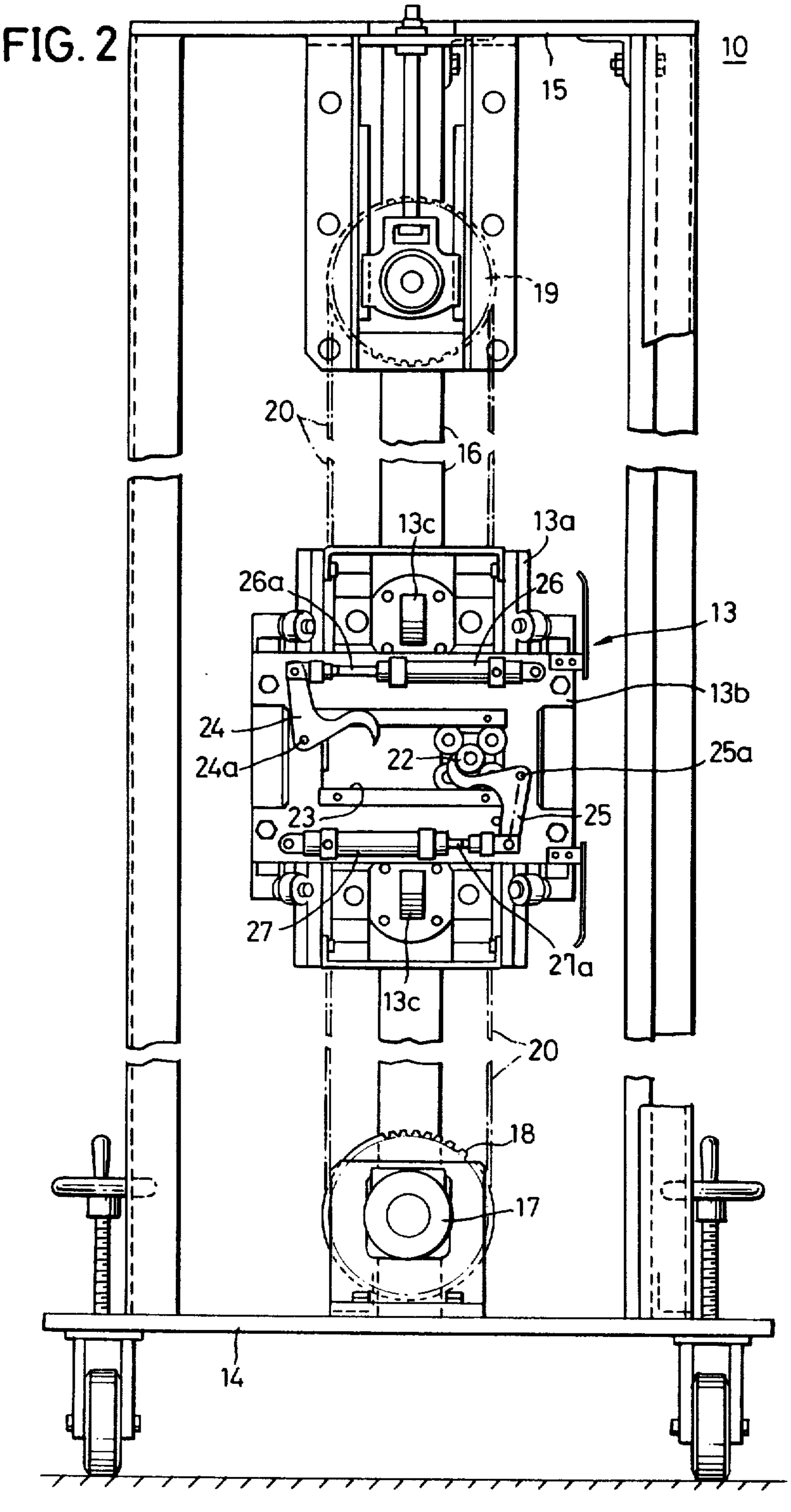
FIG. 2 and FIG. 3 are, respectively, front and side views showing the reciprocating device of FIG. 1.
Figure 3:
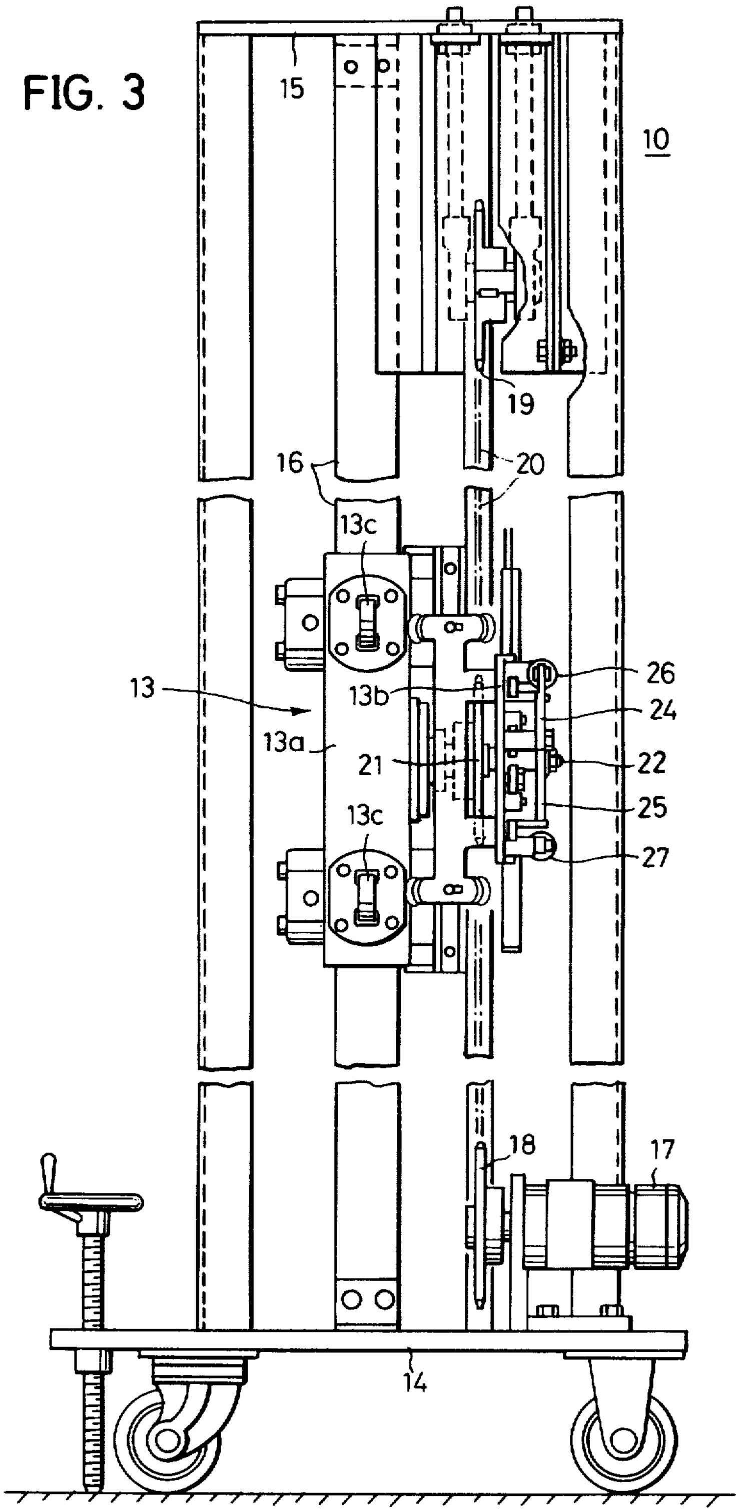

Referring now to the attached drawings, FIGS. 1 through 3 show an embodiment of the reciprocating device according to the present invention applied to an automatic reciprocating spray-coating device 11. A pair of reciprocating spray nozzles 12 are supported by a beam **12*a* at both ends thereof. The beam 12*a* is connected to a slider 13. The slider 13 comprises a hollow rectangular first frame 13*a*, and a second frame 13*b* which encircles the first frame 13*a*. The second frame 13*b* is freely slidable along the first frame 13*a*. A rectangular guide post 16 extends vertically between a bottom support plate 14 and a top support plate 15. The guide post 16 is inserted through the first frame 13*a* so that the first frame 13*a* is freely movable along the guide post 16. There are guide rollers 13*c* provided at the four sides of the first frame 13*a*. The hollow rectangular second frame 13*b* is guided by the guide rollers 13*c*, and is free to move along the first frame 13*a*. The beam 12*a* is secured to the second frame 13*b***.

A motor 17 is supported on the bottom support plate 14. A sprocket wheel 18 is fixed to a rotary shaft of the motor 17, and a sprocket wheel 19 is supported below the top support plate 15. An endless chain 20 extends between the two sprocket wheels 18 and 19. The chain 20 and the guide post 16 are substantially parallel to each other. In the explanation described hereinafter, the left-side-span **20*a* of the chain 20 in FIG. 1 shall be considered as the forward (going up) side, and the right-side-span 20*b* of the chain 20** as the backward (going down) side.

A fan-shaped sprocket 21 meshing with the chain 20 is located at the front side of the first frame **13*a*. The fan-shaped sprocket wheel 21 is rotated by the movements of the chain 20. In this embodiment of the present invention, the fan-shaped sprocket wheel 21 has a center angle of approximately 190 degrees. The fan-shaped sprocket wheel 21 has teeth formed around the outer circumference thereof. As clearly shown also in FIGS. 4A through 4D, a pin 22 is fixed to the fan-shaped sprocket wheel 21 and passes through a lateral opening 23 provided in the central portion of the second frame 13*b*. The pin 22 is long enough so that one end thereof projects outside the second frame 13*b***.

A pair of goose-neck shaped clamps 24 and 25 are rotatably supported, by pins 24a and 25b, respectively, on the left and right sides of the front surface of the second frame 13b. The clamps 24 and 25 are both rotatable within a predetermined angle range. The projected end of the pin 22 is selectively clamped by either clamp 24 or clamp 25. The selective clamping action of the two clamps 24 and 25 stops the rotation of the fan-shaped sprocket wheel 21. The teeth of the fan-shaped sprocket wheel 21 selectively mesh with either one of the right and left side spans of the chain 20.

And, when the teeth of the fan-shaped sprocket wheel 21 which is meshed with one side span of the chain 20 selectively meshes with the other side span of the chain 20, the fan-shaped sprocket wheel 21 stops rotating at one point. This stoppage of rotation of the fan-shaped sprocket wheel 21 momentarily fixes the meshing of the fan-shaped sprocket wheel 21 with one section of the chain 20. Since the fan-shaped sprocket wheel 21 is engaged with the front side of the first frame 13a, the movement of the chain 20 is transmitted to the slider 13 when the fan-shaped sprocket wheel 21 is not rotating.

Spring loaded cylinders are used as cylinders 26 and 27 for operating the clamps 24 and 25. The cylinders 26 and 27 are both mounted on the front side of the second frame 13b. Piston rods 26a and 27a are fixed to one end of the clamps 24 and 25, respectively.

A restriction member 28 is fixed unitarily on top of the first frame 13a. The restriction member 28 also encircles the guide post 16 so that it moves freely along the guide post 16. A spring loaded cylinder 29 with a piston rod 29a is fixed on the restriction member 28. The end of the piston rod 29a faces the guide post 16. When the cylinder 29 is actuated, the piston rod 29a pushes against the guide post 16. This movement of the piston rod 29a stops the restriction member 28 at a predetermined position on the guide beam 16.

Two sprocket wheels 31 and 32 are supported on the bottom support plate 14 and below the top support plate 15, respectively. A first chain 30 hung between two sprocket wheels 31 and 32 is used for detecting the displacement of the second frame 13b. The first chain 30 is fixed at two points in the left side edge of the second frame 13b. A second chain 33 is located beside the first chain 30. The second chain 33 is hung between sprocket wheels 34 and 35. The sprocket wheels 31 and 34 are fixed to a rotary shaft rotatably supported on the bottom support plate 14. The sprocket wheel 34 has less teeth than the sprocket wheel 31. The sprocket wheel 35 is also rotatably supported on the bottom support plate 14. The moving speed of the first chain 30 is reduced according to the ratio of the number of teeth on the sprocket wheels 31 and 34. Thus the moving distance of the second frame 13b can be detected by the reduced displacement of the second chain 33.

A pair of air limit switches 37 and 38 are fixed on the bottom support plate 14. The air limit switches 37 and 38 are located along one side of the second chain 33. The air limit switch 37 is located above the air limit switch 38, and they are separated by a predetermined distance. The air limit switches 37 and 38 are actuated by a pin 36 fixed on a predetermined position of the second chain 33. When the air limit switch 38 is actuated, air is supplied to the cylinder 27 to actuate it. The cylinder 27 is supplied with air and actuated also when the air limit switch 37 is actuated. This alternate actuation of the air limit switches 37 and 38 stops the restriction member 28 at certain positions on the guide post 16, the stopping positions being preselectable by the positioning of the air limit switches 37 and 38.

Figure 4A:
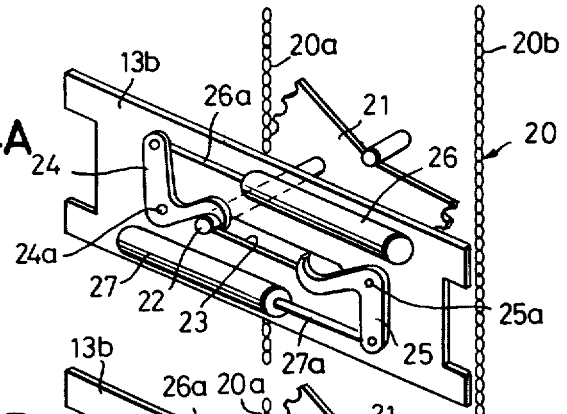
FIG. 4A through FIG. 4D are, respectively, perspective views showing the respective operational states of the essential parts of the reciprocating device of FIG. 1.

The operation of the clamping mechanism shall now be described in detail by the use of FIGS. 4A through 4D. In FIG. 4A, the pin 22 is locked in position by the clamp 24, whereby the sprocket wheel 21 is clamped not to rotate. In this position, the sprocket wheel 21 meshes and engages with only the forward (going up) side span 20a of the chain 20. Thus, when the motor 17 is driven, the first frame 13a and the second frame 13b of the slider 13 are lifted upwards by the movement of the chain 20.

Figure 4B:
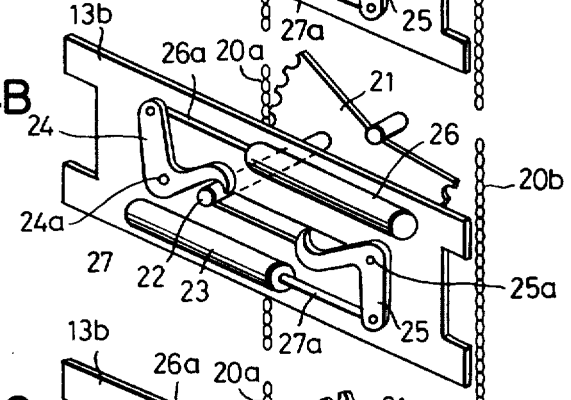

When the first frame 13a approaches the upper limit position, the air limit switch 37 is actuated by the pin 36 and air is supplied to the cylinders 26 and 29. As a result, the clamp 24 is pushed by the piston rod 26a. The clamp 24 is rotated in an anticlockwise direction as shown in FIG. 4B, and thereby to release the pin 22 from the locked state. The pin 22 is now free to move right along the lateral opening 23. The actuation of the cylinder 29 results in pushing action of the piston rod 29a against the guide post 16. Thus the restricting member 28 is stopped on the guide post 16 and the first frame 13a is restricted from any further upward movement.

Figure 4C:
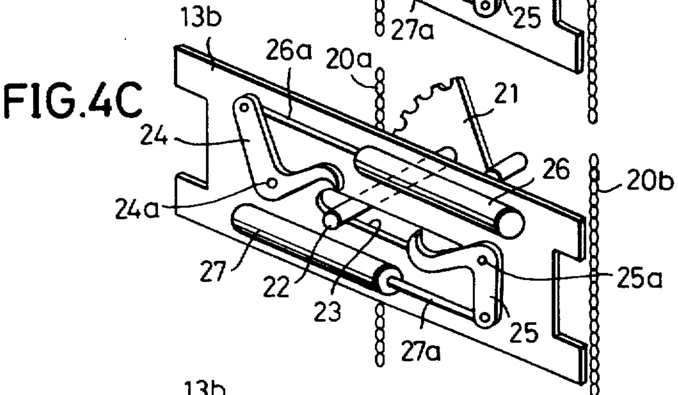
Figure 4D:
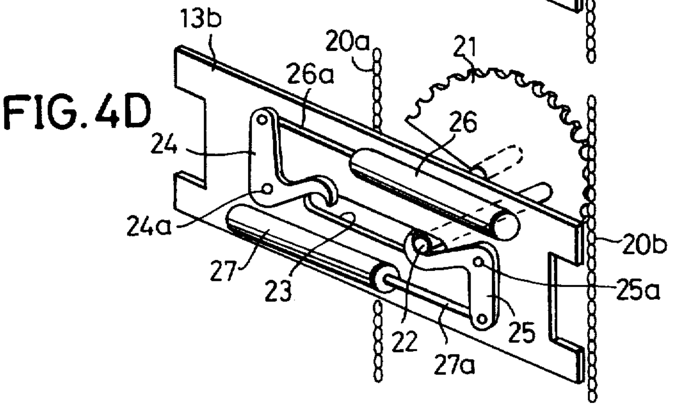

When the pin 22 is freed from the locked state, the sprocket wheel 21 becomes rotatable. The sprocket wheel 21 undergoes an approximately 180 degree clockwise rotation as shown in FIG. 4C with respect to the movement of the chain 20. Now, the teeth on the sprocket wheel 21 meshes with only the backward (going down) side span of the chain 20b as shown in FIG. 4D. During this movement, the pin 22 rotates, but the pin is also positioned to move from one side to the other side along the lateral opening 23, thus the second frame 13b makes a slight up-and-down motion from the stationary position of the first frame 13a. This small up-and-down movement of the second frame 13b eliminates blotches at the turning point when the device is applied to a spray-coating device, for example. Furthermore, when the second frame 13b is undergoing movements by itself, the pin 36 actuates the air limit switch 37. The first frame 13a is restricted from movement along the guide post 16, but the pin 36 separates from the air limit switch 37. As a result, the air limit switch 37 is released from actuation.

When the pin 22 moves to the right side of the lateral opening 23 as shown in FIG. 4D, the pin 22 is locked in position by the clamp 25, whereby the sprocket wheel 21 cannot rotate. In this position, the movement of the backward (going down) side span 20b of the chain 20 is transmitted to the sprocket wheel 21. At the same time, the actuated air limit switch 37 has been released, thus the restriction member 28 is free to move down along the guide post 16. As a result, the first frame 13a becomes free to move along the guide post 16.

Therefore, the first frame 13a which has been stopped at the upper limit position begins to move downward by the movement of the backward (going down) side 20b of the chain 20. The first frame 13a continues to go down until the pin 36 actuates the air limit switch 38, at which time the first frame 13a is stopped at the lower limit position.

The reciprocating device 11 of the above construction uses a single sprocket wheel 21 which meshes statically with the forward (going up) side span 20a and the backward (going down) side span 20b of the chain 20 selectively and alternately, and reciprocates the slider 13 within a predetermined moving range. There is no need for a bi-rotational motor, and thus the construction is simple. The slider 13 undergoes reciprocation by the motor 17 rotated in one direction.

Furthermore, the first frame 13*a* undergoes displacement along the guide post 16, so there is no need for a complicated guide means. There is no need to set up the guide posts parallel to each other as is the case where the reciprocating device uses a plurality of guide posts to guide the slider.

And, the reciprocating device 11 of the above construction detects the limits of the displacement of the second frame 13*b* by detecting the limits of the reduced displacement. Since the reduced displacement of the chain 33 is detected by the pin 36 and the limit switches 37 and 38, the limits of the reciprocal movement range can easily be adjusted by adjusting the heights of the air limit switches 35 and 36 and the distance therebetween.

In the above described embodiment of the present invention, the clamps 24 and 25 and restriction member 28 are operated by cylinders 26, 27 and 29 respectively. However, those may be operated mechanically without using air signals as shown in a reciprocating device 41 of FIG. 5.

Figure 5:
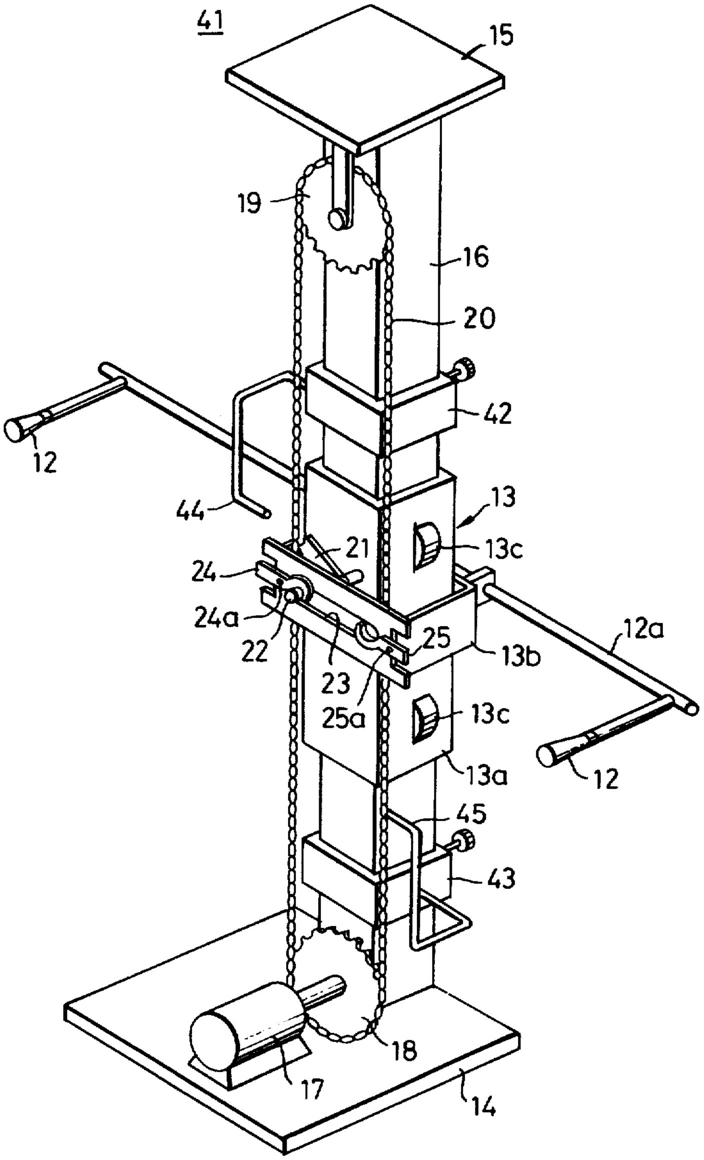
FIG. 5 is a perspective view showing a second embodiment of the reciprocating device according to the present invention.

In FIG. 5, those parts which are the same as corresponding parts in FIG. 1 are designated like reference numerals. Detailed description of such parts will not be repeated. The reciprocating device 41 has two restriction members 42 and 43 fixed at both upper and lower limit positions on the guide post 16. The restriction members 42 and 43 in this embodiment are of separate construction from the first frame 13*a*. In place of the clamp actuating cylinders 26 and 27 are clamp releasing rods 44 and 45. The clamp releasing rods 44 and 45 are fixed to the restriction members 42 and 43 respectively, as shown in FIG. 5. The range of reciprocal movement of the reciprocating device of the above construction is adjusted by adjusting the positions of the restriction members 42 and 43. Thus the chain 30 used in the reciprocating device 11 for the detection of the displacement of the slider 13 is not required on this second embodiment.

In FIG. 5, the first frame 13*a* moves up and is stopped by the top restriction member 42. At the same time, the clamp releasing rod 44 flips and releases the clamp 24. The pin 24*a* is freed and the first frame 13*a* is restricted in its movements by the restriction member 42, but the second frame 13*b* undergoes up-and-down motion on its own by the movements of the sprocket 21.

In the present embodiment, the adjustment of the range of the reciprocal movement must be made by manual operation by changing the positions of the two restriction members 42 and 43. But there is no need to supply the cylinders with air as is the case with the reciprocating device 11 in the above described first embodiment, and thus the construction is more simple. The reciprocating devices 10 and 41 are applied to a spray-coating painting apparatus, but those devices 11 and 41 may be applied to other apparatuses. Furthermore, belts or any endless members may be used instead of the chain 20 in the reciprocating devices 10 and 41.

In addition, a sprocket wheel comprising teeth around its exterior between a predetermined angle range (for example, 190 degrees) and no teeth around its exterior for the remaining part of the angle range can be used instead of the fan-shaped sprocket wheel 21.

Further, this invention is not limited to these embodiments, but variations and modifications may be made without departing from the scope of the invention.

What is claimed is:

1. A reciprocating device comprising:

an endless member such as a chain or belt having a forward side span and a backward side span, and moving in circulation;

driving means for driving said endless member along only one direction;

a reciprocating member freely movable for reciprocation, said reciprocating member comprising a first movable member and a second movable member, said second movable member being unitarily movable with said first movable member and also separately and relatively movable with respect to said first movable member;

guide means for guiding said reciprocating member substantially parallel along said forward side span and backward side span of said endless member, said guide means guiding said first movable member;

engaging means consisting of a sprocket wheel rotatably provided on said reciprocating member, for selectively engaging with either said forward side span or backward side span of said endless member, said sprocket wheel having a projection and being provided with teeth throughout a predetermined angular range, said reciprocating member moving to one side according to the movement of said endless member upon engagement of said endless member with said forward side span of said endless member, and moving to the other side upon engagement of said engaging means with said backward side span of said endless member;

changeover means for changing over the engagement of said engaging means from either one side span of said endless member to the other side span of said endless member, at predetermined reciprocating movement range limit positions of said reciprocating member, said changeover means having locking and releasing means for locking said sprocket wheel in a non-rotatable state and releasing the locking with respect to said sprocket wheel; and stopping means for stopping the movement of said first movable member at the predetermined reciprocating movement range limit positions of said reciprocating member, said stopping means being arranged and provided in a manner such that the stopping operation of said stopping means and the lock releasing operation of said locking and releasing means are performed simultaneously, said stopping means comprising means which moves unitarily with said first movable member and stops the movement of said first movable member by engaging with said guide means in an immovable manner at the reciprocating movement range limit positions of said reciprocating member, said second movable member having an elongated opening with said projection of said sprocket wheel inserted therethrough, said elongated opening extending in a direction perpendicular to said forward and backward side spans of said endless member, said second movable member moving relatively with respect to said first movable member during rotation of said sprocket wheel due to the engagement between said projection and said elongated opening, said sprocket wheel engaging to either said forward side span or backward side span in a non-rotatable state when said sprocket wheel is locked, to move unitarily with said reciprocating member in accordance with the movement of said endless member, and being rotated by the movement of said endless member when the lock with respect to said sprocket wheel is released to engage with the other side span of said endless member from either said forward side span or backward side span of said endless member, said locking and releasing means having first and second locking means for locking said projection of said sprocket wheel in a state where said sprocket wheel is fixedly engaged with either one of said forward side span or backward side span of said endless member, and means for respectively releasing the locking operation of said first and second locking means at said predetermined reciprocating movement range limit positions of said reciprocating member at both said forward and backward side spans of said endless member.

2. A reciprocating device as claimed in claim 1 further comprising:

converting means for converting the displacement of said reciprocating member to a reduced scale; and first and second limit switches provided at positions relative to the reciprocating movement range limits, said first and second locking means being released by the actuation of said first and second limit switches.

* * * * *